US007280471B2

(12) United States Patent
Rajagopal et al.

(10) Patent No.: US 7,280,471 B2
(45) Date of Patent: Oct. 9, 2007

(54) AUTOMATED NETWORK SERVICES ON DEMAND

(75) Inventors: Priya Rajagopal, Hillsboro, OR (US); David Michael Durham, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1063 days.

(21) Appl. No.: 10/196,496

(22) Filed: Jul. 15, 2002

(65) Prior Publication Data

US 2004/0008629 A1    Jan. 15, 2004

(51) Int. Cl.
*H04J 1/16* (2006.01)
(52) U.S. Cl. ....................... 370/230; 370/235
(58) Field of Classification Search ............... None
See application file for complete search history.

(56) References Cited

U.S. PATENT DOCUMENTS

| 5,905,872 A * | 5/1999 | DeSimone et al. ......... 709/245 |
| 6,240,462 B1 * | 5/2001 | Agraharam et al. ........ 709/238 |
| 7,054,949 B2 * | 5/2006 | Jennings ................... 709/238 |

OTHER PUBLICATIONS

Sahita et al, Elimination of DDoS Attacks using Programmable Network Processors, Intel Research and Development, pp. 1-4, Jun. 2002.*

* cited by examiner

*Primary Examiner*—Frank Duong
(74) *Attorney, Agent, or Firm*—Marger Johnson & McCollom, P.C.

(57) ABSTRACT

A fully automated method of providing network services on demand is disclosed. The method includes receiving a request for download traffic from a user and beginning transmission of the download traffic to the user. The user is provided with the option of requesting better service level if required for an extra cost. If the user experiences poor service quality, the user then submits a service request by simply clicking a button. The NHCC then automatically identifies the customer traffic, determines the service parameters for the download traffic. With a global view of the existing network topology and conditions, the NHCC determines if the incoming service level request can be accommodated. If the network can be provisioned to accommodate the request, the NHCC sends traffic provisioning requests to Smart Nodes. The download traffic quality then improves thereby providing the customer with better quality of service. Thus, customers can request for better service levels on-demand with minimal knowledge of the existing network infrastructure.

14 Claims, 3 Drawing Sheets

AUTOMATED NETWORK SERVICES ON DEMAND

BACKGROUND

As networks grow in complexity and size, network service providers are faced with the challenging task of guaranteeing the desired Quality of Service to its customers. Service Level Agreements (SLAs) negotiated between customers and the network service providers provide a way for the customers to specify the type of performance guarantees that are required for their traffic. These SLAs are generally negotiated well in advance before the customer actually uses the service. This implies that the customer should be aware well in advance if he would need preferential service, which in turn implies that the customer might have to pay up-front for better service, which he may not even use. Most customers are not technically qualified enough to specify their requirements in such a way that would result in an SLA that provides the level of service they need for the best price.

In addition, aspects of the network may make provisioning the traffic according to an SLA more difficult. An SLA also specifies the technical details such as performance requirements such as jitter, latency, and throughput in addition to identification of the traffic flow itself. The traffic flow is generally specified by source and destination address information. Some networks may include network address translators, which allow networks that do not have globally unique addresses to connect to larger networks. The network address translator translates the local, non-unique addresses into globally unique addresses, which in turn may make determination of the source and destination of the traffic flow difficult.

It would be highly desirable to have a mechanism wherein customers can request the desired service levels on a need-to basis. Also, a mechanism that will free the customer of technical details involved in specifying the exact service level requirements would be helpful.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
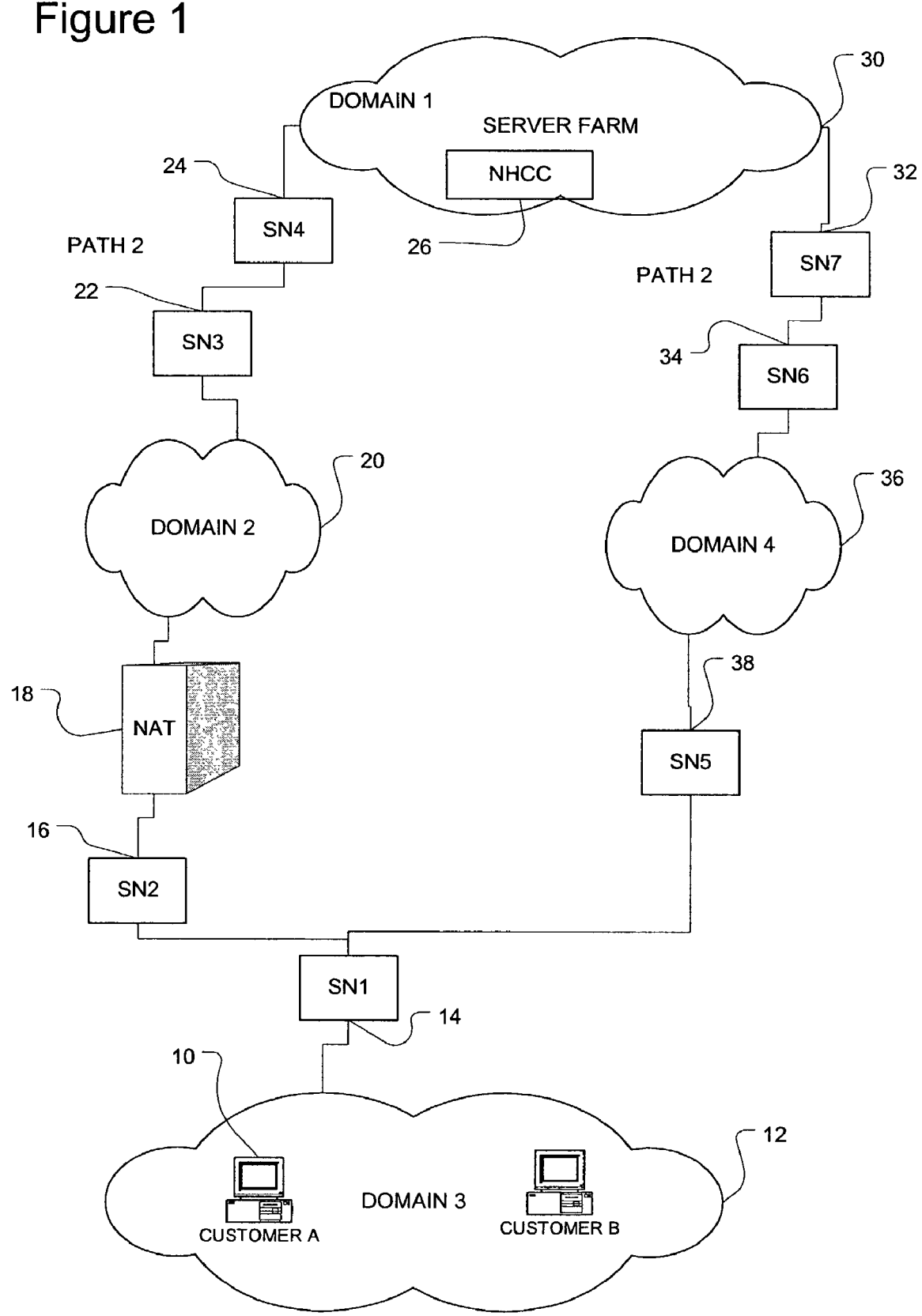
FIG. 1 shows an embodiment of a network that includes Smart Nodes and network health control centers.

The Service Level Agreements (SLAs) have to be typically negotiated well in advance for the ISP to be able to ensure that the requested service can be granted for the customer traffic. The SLAs also typically require very specific and technical knowledge about the requirements of the customer traffic. These include specifying expected jitter, latency, and throughput levels. These requirements vary with the type of traffic. Since the user has no knowledge of the state of the network at the time when he/she is using the network, the user may end up paying for a level of service that may not be required. At the same time, the user may underestimate the traffic requirements and thereby receive poor quality of service.

Embodiments of the invention may provide a framework and a methodology comprised of a distributed architecture comprised of intelligent processing devices, referred to here as Smart Nodes (SN) controlled and co-coordinated by a central management station, herein referred to as the Network Health Control Center (NHCC). Embodiments of the invention further discuss a novel approach that integrates the capabilities of these devices that would enable delivering of services to customers on demand. These SNs are distributed in strategic locations throughout the network, typically at the edges of the network and form a "virtual" network that overlays the actual physical network.

SNs are devices with several characteristics, including the ability to send customized traffic to all other SNs, and to classify traffic based on application type and source and destination specifications. For IP networks, source and destination IP addresses and ports are the source and destination specifications. SNs also collect statistical information like byte count, packet count on a per-flow or aggregate-flow basis. All the statistical information is precisely time-stamped. In addition, the SNs also cache information about flows seen in the recent past. This would include the source and destination specifications along with the statistical information for all the flows that were observed at the SN.

SNs also perform deep packet inspection, where they are able to inspect the incoming packets for specific patterns in the packet payload. The SNs are also capable of tunneling packets, which involves encapsulating a flow within another flow. Specifically, the SN can act as a tunnel start point and should be capable of 'wrapping' original packets with a new header that would specify a new destination end point for the packet. This would force the packets to follow a new route. The SN can act as tunnel end-points wherein they remove the outer encapsulating header and process the packet.

With regard to the relationship between the SNs and the NHCC, the SNs would listen for all network error messages, communicate with the NHCC using a suitable management protocol.

A data flow is typically identified by source and destination information such as the source address, destination address, source port, destination port, and protocol. Note that the terms 'packets' and 'payloads' are not intended to limit application of the invention to the Internet Protocol (IP) realm. The term packet as used here describes any datagram of any format that is transmitted across a network, and the term payload refers to that part of the datagram that is not the header or other administrative information generally found in the specified format that enables routing and control of the datagram.

NHCCs are management stations that are capable of controlling a set of SNs in the network. They may be capable of periodically schedule active network analysis tests to ascertain the network conditions, such as bandwidth availability, loss rate, jitter, latency, etc. The topology of the network is comprised of an "overlay" network of SNs. The NHCC is aware of the topology of this virtual network of SNs. This implies that the NHCC should be aware of changes to the network topology that includes addition of paths, removal of links, etc. They may also communicate with all the SNs using appropriate communication protocols.

FIG. 1 shows an example of a network in which there are deployed several SNs, under control of a NHCC 26 at a network provider server farm 26. The NHCC may be located elsewhere in the network, but will more than likely be centrally located to allow the SNs to communicate with it more efficiently. In the example of FIG. 1, there are two paths for the data to take between the customer A 10 in DOMAIN 3, 12, to the network provider server farm 30. Path 1 includes SN1, 14, SN2, 16, NAT, 18, SN3, 22, and SN4, 24. This path also crosses through DOMAIN 2. Path 2 also includes SN1, but then diverges to SN5, 28, SN6, 34, and SN7, 32. Path 2 crosses through DOMAIN 4, 36. For ease of discussion, the content desired by the users is assumed to reside at the network provider server farm 30, although it is possible that the download traffic may originate elsewhere.

Figure 2:
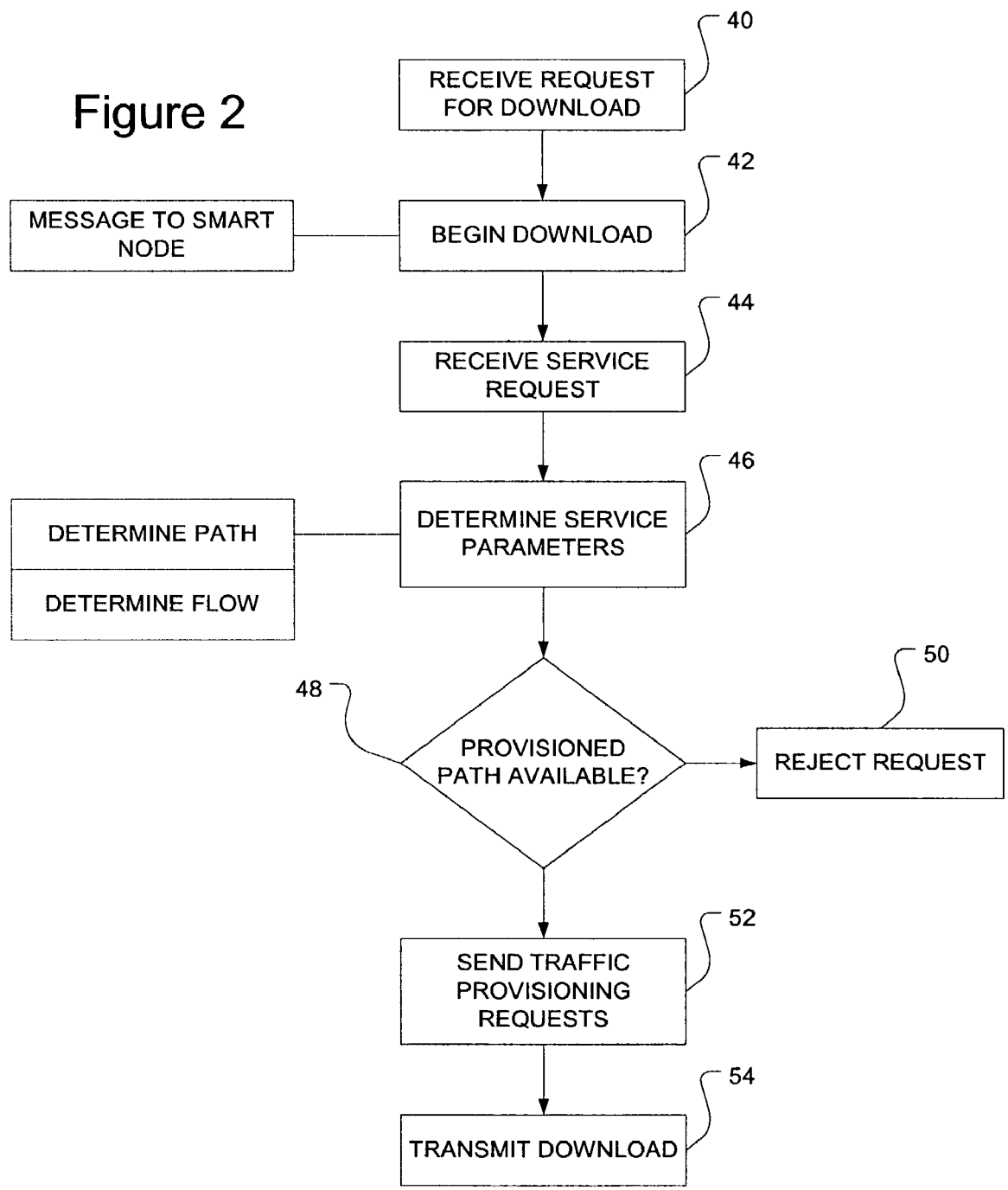
FIG. 2 shows a flowchart of an embodiment of a method to provision traffic for on-demand network service.

In order to promote understanding of the embodiments of the invention, a scenario in which customer A desires to download content from the server farm of the associated network provider is assumed. Note that the term download traffic may be used instead of the term 'flow.' A flowchart of an embodiment of the invention using this scenario is shown in flowchart form in FIG. 2.

At 40, the server farm receives a request for a download. At 42, a server in the server farm begins downloading the data. Included in this download, or as a separate message, the network provider may offer the user at least one preferential service option. This may include several different download speeds for varying prices. Also included in the download traffic is a unique identifier that identifies the request. This would be generated for every download request.

In an embodiment of the invention, the NHCC may also send messages to the SNs along the possible paths that the download traffic may follow. These messages may include requests to have the SNs perform deep packet inspection looking for the unique identifier. The SNs may also be requested to store the source address, of the download traffic associated with each ID. The SNs may be instructed to report this source address information along with the unique identifier to the NHCC. After the download is begun, for example, it may follow Path 1. All of the SNs along that path would locate the identifier upon deep inspection of the packets.

The flow information associated with the identifier information would be sent back to the NHCC. This information enables the NHCC to automatically determine the customer address without requiring any interaction with the customer A. In addition, the information allows the NHCC to correlate the identifier-customer address pair from the SNs and determine the path the original download traffic is following. The flow information also helps in identifying the application type. The knowledge of application type would be useful in identifying the performance metrics associated with the specific application type.

Under conditions of heavy network traffic load, such as high traffic in Domain 2, the customer may experience very long download times. The user then selects the preferential services offer, agreeing to pay the higher price. This is as simple as a click of a button without requiring any elaborate service level specifications. In addition, the customer selects this option only if he is experiencing long network delays. This selection causes a service request to be constructed on behalf of the user, including the unique identifier, and sent to the NHCC. The NHCC receives the server request at 44.

The NHCC then uses the information collected from the SNs to determine the service parameters associated with the request at 46. The service parameters that include performance metrics such as latency, jitter and bandwidth requirements are constructed based on application type, existing network conditions and the specified preferred service quality level. Identification of the flow associated with the customer traffic may include the NHCC sending queries along the path of the original download. Since the SN only caches statistics associated with the most recent flows, there is a very high probability that the service request was made for one of these flows, indeed a high probability that the service request was made for the most recent flow. In an embodiment, the NHCC may assume that the most recent flow is the flow of interest and is the one that is associated with customer traffic.

In addition to the information necessary to identify the flow, the NHCC may also have information with regard to the network performance. This may include current available capacity, all the alternative paths, identification of any other preferential requests along the path, etc. The NHCC then determines if the service request can be granted, based on this analysis, at 48. If the existing network conditions cannot allow the incoming service request to be accommodated, the request is rejected at 50.

If, however, the network has enough resources to accommodate the request, NHCC will then send out messages to the SNs along the path at 52. These messages direct the SNs to grant preferential service to the specified flow. These messages will guarantee that the download traffic the specified service level. Finally, at 54 the download traffic is transmitted as per the service level specifications.

In this manner, the customer gets better download quality and speed. In addition, the user is only charged for this usage and the duration of this usage at the higher, preferred service rate. This prevents the user from having to pay more for capacity that may not be used, as well as having to understand the details of the traffic flow to negotiate a service level agreement.

Figure 3:
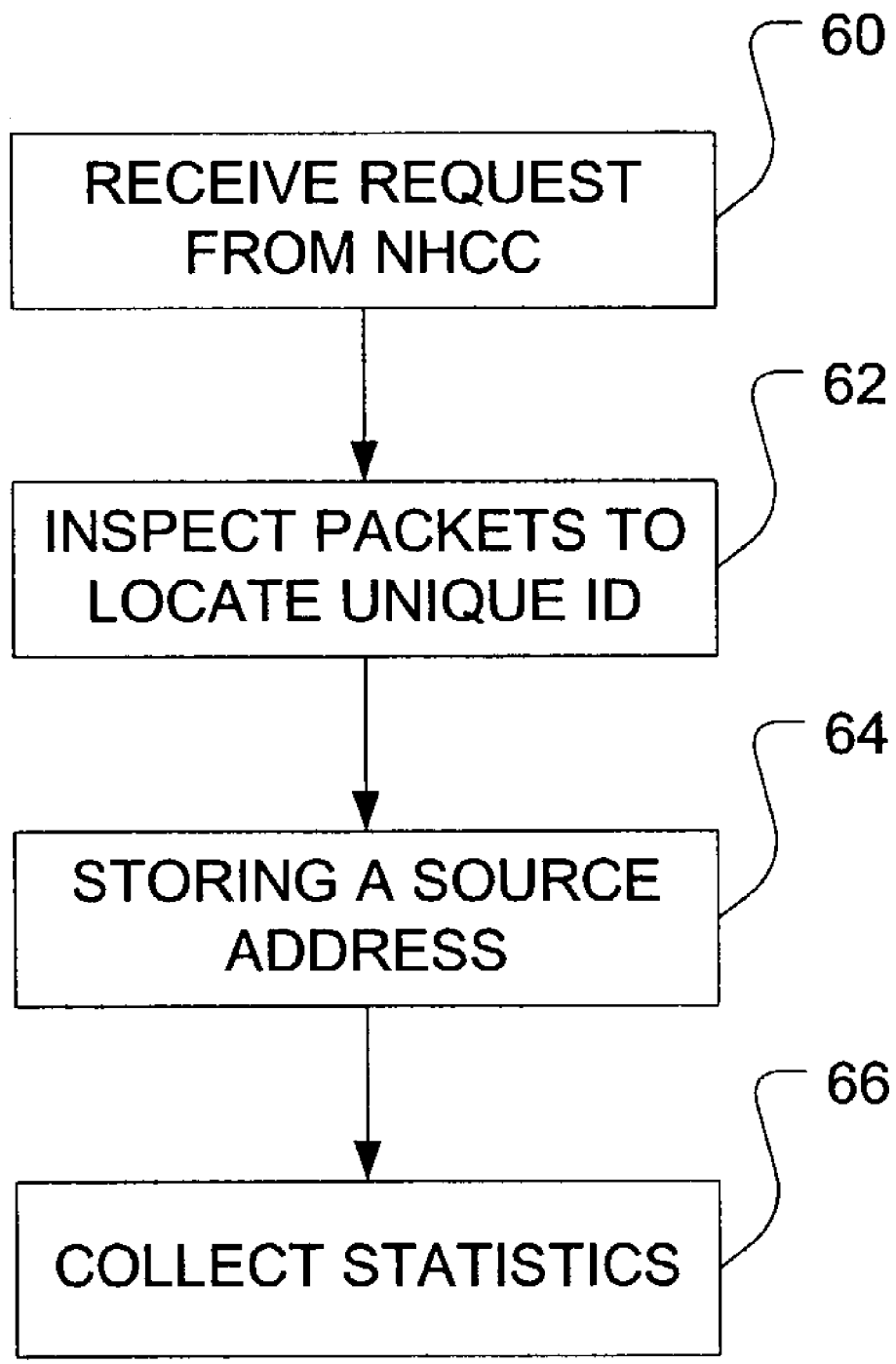
FIG. 3 shows a flowchart of an embodiment of a method to provide traffic information.

In order to provide this service, the NHCC relies upon the SNs to carry out specific tasks and processes to enable the NHCC to make the necessary decisions. An embodiment of a method to provide these service statistics is shown in flowchart form in FIG. 3. At 60, the SN receives a request from a NHCC that includes the unique identifier for which the NHCC requires tracking. At 62, the SN performs deep inspection on the packets to determine if the unique identifier is in the payload. If the identifier is located at 62, the source address for that packet is stored by the SN at 64. In addition, the SN may collect statistics with regard to the packets with the unique identifier. This information allows the NHCC to determine the necessary parameters for provisioning the traffic.

The Smart Nodes and the NHCC may already exist in current networks as switches, routers and other network appliances. These devices may be upgraded to perform the functions of Smart Nodes and NHCCs with the installation of software code. Generally, the embodiments of the invention would be contained on an article of machine-readable code that, when executed, would cause the machines to perform the steps of the invention. The machines in the example of FIG. 1 would be the Smart Nodes and servers.

Other types of preferential service may employ the embodiments of the invention beyond download speeds for large files. For example, high priority messages or real-time traffic may cause the user to request a higher quality of service. Examples of real-time traffic may include voice or video being transmitted across a network. Similarly, legitimate users may request better service during attacks on the network, such as a distributed denial of service, or 'network hijacking.'

In this manner, a fully automated system is provided to network providers to allow them to manage their networks more efficiently without over or under provisioning their networks. The system would provide users with a simple method to request better service.

Thus, although there has been described to this point a particular embodiment for a method and apparatus to provide automated network services on demand, it is not intended that such specific references be considered as limitations upon the scope of this invention except in-so-far as set forth in the following claims.

What is claimed is:

1. A method of providing network service, the method comprising:
   receiving a request for download traffic from a user;
   beginning transmission of the download traffic to the user;
   receiving a service request associated with the download traffic;
   determining service parameters for the download traffic;
   identifying if a provisioned path is available for the download traffic, including:
      analyzing service statistics for the download traffic; and
      determining a path along which priority requests will be honored for the download traffic; and
   sending traffic provisioning requests to Smart Nodes along the provisioned path, if a provisioned path is available.

2. The method of claim 1, wherein the method further comprises sending messages to Smart Nodes along possible paths for the download traffic identifying the download traffic with a unique identifier coincident with transmitting the download traffic to the user.

3. The method of claim 2, wherein the message further comprises a request for the Smart Nodes to inspect packets for the unique identifier.

4. The method of claim 1, wherein the method further comprises transmitting the download traffic along the provisioned path.

5. The method of claim 1, wherein transmitting the download traffic to the user further comprises including at least one preferential services option in the download traffic.

6. The method of claim 1, wherein determining service parameters for the download traffic further comprises:
   determining an original path of the download traffic;
   querying Smart Nodes along the original path for service statistics; and
   identifying a flow of the download traffic.

7. The method of claim 1, wherein the method further comprises rejecting the service request if no provisioned path is available.

8. An article of computer-readable media containing code that, when executed, causes the computer to:
   receive a request for download traffic from a user;
   transmit the download traffic to the user;
   receive a service request associated with the download traffic;
   determine service parameters for the download traffic;
   identify if a provisioned path is available for the download traffic, including causing the computer to:
      analyze service statistics for the download traffic; and
      determine a path along which priority requests will be honored for the download traffic; and
   send traffic provisioning requests to Smart Nodes along the provisioned path, if a provisioned path is available.

9. The article of claim 8, wherein the code, when executed, further causes the computer to send messages to Smart Nodes along possible paths for the download traffic identifying the download traffic with a unique identifier coincident with transmitting the download traffic to the user.

10. The article of claim 8, wherein the message further comprises a request for the Smart Nodes to inspect packets for the unique identifier.

11. The article of claim 8, wherein the code, when executed, further causes the computer to transmit the download traffic along the provisioned path.

12. The article of claim 8, wherein the code causing the computer to transmit the download traffic to the user further causes the computer to include at least one preferential services option in the download traffic.

13. The article of claim 8, wherein the code causing the computer to determine service parameters for the download traffic further causes the computer to:
   determine an original path of the download traffic;
   query Smart Nodes long the original path for service statistics; and
   identify a flow of the download traffic.

14. The article of claim 8, wherein the code further causes the computer to reject the service request if no provisioned path is available.

* * * * *